US008054976B2

(12) United States Patent
Harrison et al.

(10) Patent No.: US 8,054,976 B2
(45) Date of Patent: Nov. 8, 2011

(54) QUANTUM KEY DISTRIBUTION APPARATUS AND METHOD

(76) Inventors: Keith Alexander Harrison, Bristol (GB); William John Munro, Bristol (GB); John Gilroy Rarity, Bristol (GB); Joanna Louise Duligall, Bristol (GB)

( * ) Notice: Subject to any disclaimer, the term of this patent is extended or adjusted under 35 U.S.C. 154(b) by 1515 days.

(21) Appl. No.: 11/454,624

(22) Filed: Jun. 16, 2006

(65) Prior Publication Data

US 2007/0025551 A1 Feb. 1, 2007

(30) Foreign Application Priority Data

Jun. 16, 2005 (GB) .................................. 0512229.6
Sep. 29, 2005 (GB) .................................. 0519842.9

(51) Int. Cl.
*H04L 9/08* (2006.01)
(52) U.S. Cl. ....................................................... 380/278
(58) Field of Classification Search .................. 380/278
See application file for complete search history.

(56) References Cited

U.S. PATENT DOCUMENTS

| 4,684,248 | A |   | 8/1987 | Cinzori |        |
|-----------|---|---|--------|---------|--------|
| 5,515,438 | A |   | 5/1996 | Bennett |        |
| 5,675,648 | A | * | 10/1997| Townsend| 380/278|
| 5,732,139 | A | * | 3/1998 | Lo et al.| 380/28|
| 5,770,850 | A |   | 6/1998 | Bowen   |        |
| 5,999,285 | A |   | 12/1999| Brandt  |        |
| 6,678,379 | B1| * | 1/2004 | Mayers et al. | 380/278 |
| 7,245,722 | B2| * | 7/2007 | Hirota et al. | 380/256 |
| 7,260,222 | B2| * | 8/2007 | Ishizuka et al. | 380/255 |
| 7,359,512 | B1| * | 4/2008 | Elliott | 380/253 |
| 7,461,323 | B2| * | 12/2008| Matsumoto et al. | 714/758 |
| 7,471,790 | B2| * | 12/2008| Yoshida et al. | 380/28 |
| 7,602,919 | B2| * | 10/2009| Berzanskis et al. | 380/277 |
| 2006/0059403 | A1 | * | 3/2006 | Watanabe | 714/758 |
| 2006/0290941 | A1 | * | 12/2006| Kesler et al. | 356/491 |

FOREIGN PATENT DOCUMENTS

WO  WO01/86855  11/2001

OTHER PUBLICATIONS

Bennett, C.H., et al., "Generalized Privacy Amplification" IEEE Transactions on Information Theory, vol. 4, No. 6, pp. 1915-1923 (Nov. 1995).

* cited by examiner

*Primary Examiner* — Kim Vu
*Assistant Examiner* — John B King

(57) ABSTRACT

A quantum key distribution (QKD) system is provided that makes use of a quantum signal of polarized photons and comprises a QKD device and complimentary QKD apparatus. The QKD device has a QKD subsystem comprising one of a QKD transmitter and receiver for inter-working with a complimentary QKD receiver or transmitter of said apparatus. The device also has an alignment subsystem arranged to wirelessly interact with the QKD apparatus to enable generation of user feedback and/or adjustment signals for use in aligning the QKD transmitter and receiver such that the QKD transmitter is pointing at the QKD receiver and the polarization axes of the QKD transmitter and receiver are aligned.

22 Claims, 6 Drawing Sheets

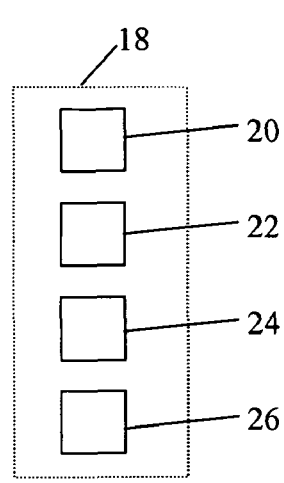
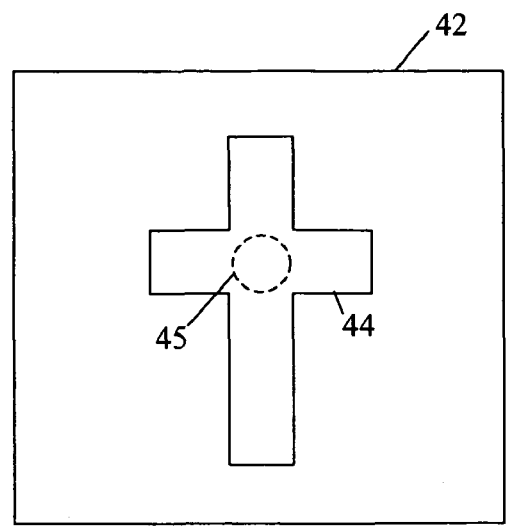
Figure 3
Figure 4
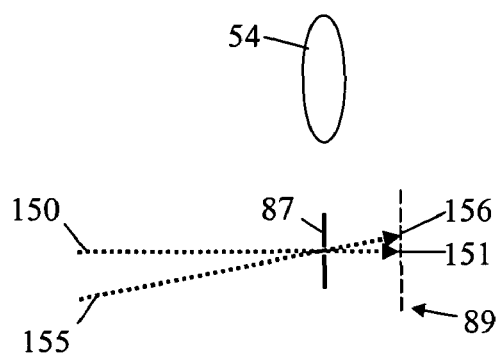
Figure 7A
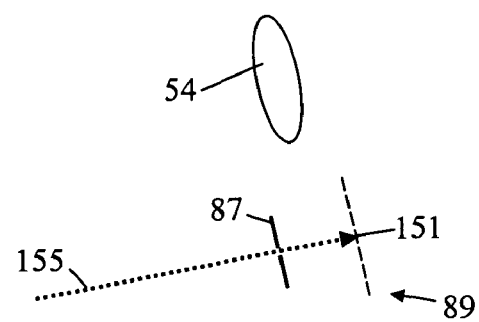
Figure 7B

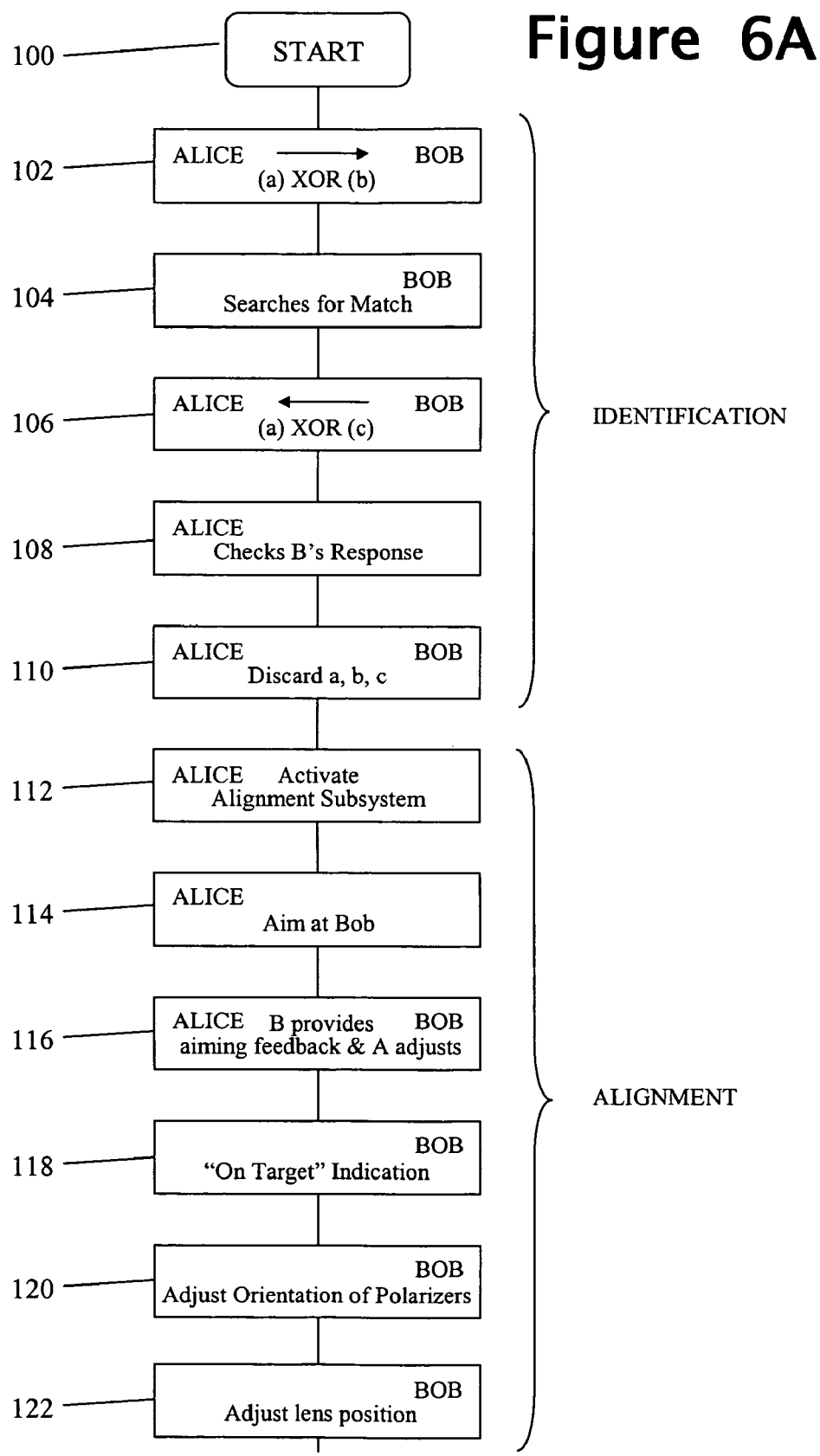

US 8,054,976 B2

QUANTUM KEY DISTRIBUTION APPARATUS AND METHOD

FIELD OF THE INVENTION

The present invention relates to quantum key distribution apparatus and methods.

BACKGROUND TO THE INVENTION

With advances in computing, and in particular with the possibility of quantum computing platforms becoming available, the once secure public key infrastructure based on RSA encryption is coming under question. As part of the desire to address possible security shortcomings work is currently underway to develop a quantum key based infrastructure.

Preferred embodiments of the present invention aim to provide apparatus usable in such an infrastructure.

SUMMARY OF THE INVENTION

According to one aspect of the present invention, there is provided a device for quantum key distribution, herein QKD, using a quantum signal of polarized photons, the QKD device being intended for use with complimentary QKD apparatus, the device comprising:
 a QKD subsystem comprising one of a QKD transmitter and receiver for inter-working with a complimentary QKD receiver or transmitter of said apparatus; and
 an alignment subsystem arranged to wirelessly interact with said apparatus to enable generation of adjustment signals for use in aligning the QKD transmitter and receiver such that the QKD transmitter is pointing at the QKD receiver and the polarization axes of the QKD transmitter and receiver are aligned.

According to another aspect of the present invention, there is provided apparatus for quantum key distribution, herein QKD, using a quantum signal of polarized photons, the QKD apparatus being intended for use with complimentary QKD device, the apparatus comprising:
 a QKD subsystem comprising one of a QKD transmitter and receiver for inter-working with a complimentary QKD receiver or transmitter of said device; and
 an alignment subsystem arranged to wirelessly interact with said device to generate adjustment signals for use in aligning the QKD transmitter and receiver such that the QKD transmitter is pointing at the QKD receiver and the polarization axes of the QKD transmitter and receiver are aligned.

BRIEF DESCRIPTION OF THE DRAWINGS

The present invention will now be described, by way of example only, with reference to the accompanying diagrammatic drawings of example embodiments, in which:

FIG. 3 is a schematic plan view of an array of light emitting diodes used in the transmitting apparatus of FIG. 2;

FIG. 4 is a schematic illustration of a shaped shutter used to generate a shaped light beam in the transmitting apparatus of FIG. 2;

FIGS. 6A and 6B together form a functional flow diagram illustrating an example method of operation of the system shown in FIGS. 1-5;

FIGS. 7A and 7B is a schematic illustration of an arrangement for aligning the optical axes of the transmitting apparatus of FIG. 2 and of the receiving apparatus of FIG. 5.

DESCRIPTION OF THE PREFERRED EMBODIMENTS

Figure 1:
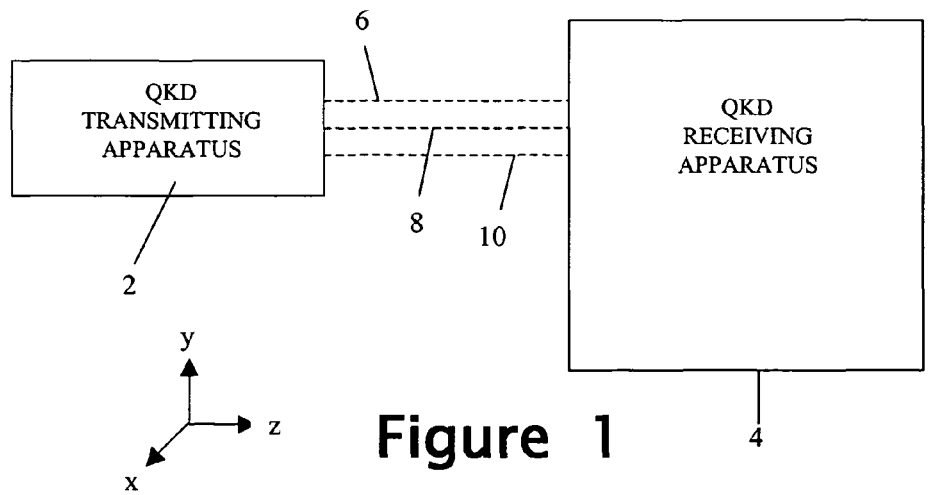
FIG. 1 is a schematic illustration of a quantum key distribution system embodying the present invention.

Referring to FIG. 1 of the accompanying drawings there is shown an quantum key distribution (QKD) system comprising a quantum-key-distribution transmitting apparatus 2 and a quantum-key-distribution receiving apparatus 4. The transmitting apparatus 2 can be any mobile device such as a mobile phone, Personal Digital Assistant (PDA), laptop, digital camera etc; preferably, the transmitting apparatus is hand-portable and adapted for hand-held operation. The receiving apparatus 4 is a base station and can be included in any convenient location or equipment such as an ATM, information point, cashier's terminal, etc. For the purpose of illustrating this embodiment of the present invention, the transmitting apparatus 2 is a mobile phone and the receiving apparatus 4 is a bank's ATM.

The transmitting apparatus 2 includes emitters for three channels between the transmitting apparatus 2 and the receiving apparatus 4. The first channel 6 is a classical communication channel (that is, one not relying on quantum technology) such as an Infrared Data (IrDA), BLUETOOTH (Trade Mark) or the normal wireless communication channel of the mobile phone. The second channel 8 is a quantum channel provided by the sending of a quantum signal. The third channel 10 is an alignment channel for facilitating directional and angular alignment of the transmitting apparatus 2 and receiving apparatus 4; in some embodiments, the alignment channel is made up of multiple sub-channels.

A quantum signal, in the present context, is a signal capable of conveying sufficient data to enable a quantum cryptographic transaction with another entity. Thus, for example, in one embodiment, a source and transmitter are required which are capable of preparing and transmitting the quantum state which it is desired to send to a requisite degree of accuracy.

A requirement for the successful transmission of the quantum signal in the quantum channel 8 is that the quantum signal is correctly aligned with a quantum signal detector of the receiving apparatus 4, both directionally and such that the polarization directions of the transmitting an receiving apparatus 2, 4 have the same orientation. This is achieved using the alignment channel 10. If it is considered that the transmitting apparatus emits along a z-direction, with the x, y and z-directions all being mutually orthogonal (see FIG. 1), aiming correction refers to relative adjustment of the transmitting and receiving apparatus (or of components of one or both apparatus) so that the z axis of the transmitting apparatus substantially intersects the centre of the lens 54, and orientation correction refers to relative rotation of the transmitting and receiving apparatus (or of components of one or both apparatus) about the z axis to align the directions of polarization of polarizers of the transmitting and receiving apparatus 2, 4.

Figure 2:
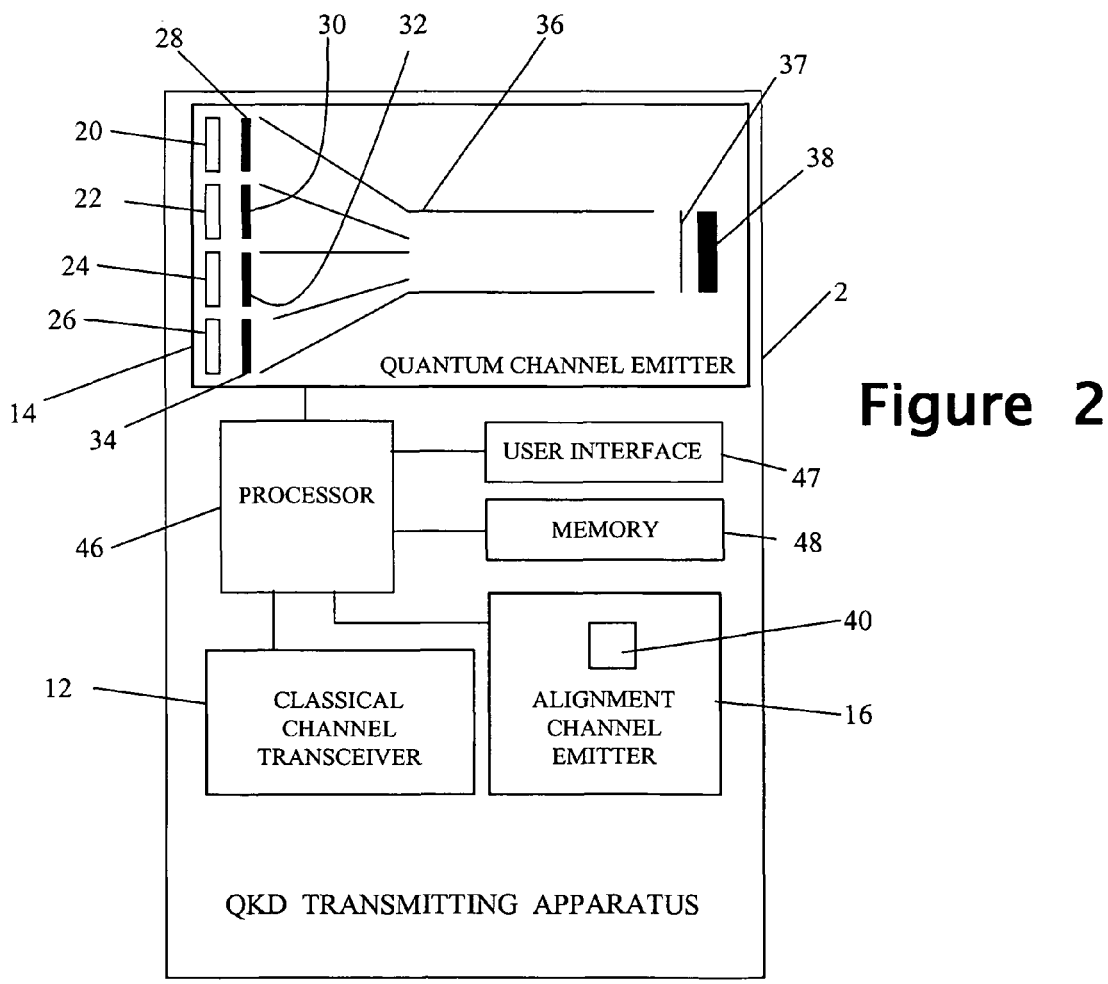
FIG. 2 is a schematic illustration of an embodiment of a quantum key distribution transmitting apparatus usable in the FIG. 1 system.

Referring to FIG. 2 of the accompanying drawings, the transmitting apparatus 2 is shown to comprise a first (classical) channel transceiver 12, a second (quantum) channel emitter 14 and a third (alignment) channel emitter 16.

The first (classical) channel emitter 12 is a IrDA transmitter. This provides a data-communication channel for wireless communication between the transmitting apparatus 2 and receiving apparatus 4.

Referring to FIGS. 2 and 3 of the accompanying drawings, the second (quantum) channel emitter 14 comprises an array 18 of light emitting diodes (LEDs) 20, 22, 24 and 26. Referring now specifically to FIG. 2, in front of each LED 20, 22, 24 and 26 is a respective polarising filter 28, 30, 32, 34. Filter 28 polarises the photons emitted from LED 20 vertically, filter 30 polarises the photons emitted from LED 22 horizontally, filter 32 polarises the photons emitted from LED 24 diagonally and filter 34 polarises the photons emitted from LED 26 anti-diagonally (the directions of polarisation are stated relative to an intended orientation of the apparatus 2 when in use). Thus, after passing through the filters 28, 30, 32, 34, the photons are polarised in four directions, each at 45° to another thus providing two pairs of orthogonal polarisations. The LEDs 20, 22, 24, 26 are narrow frequency emitters such as those available from Agilent Technologies, Inc. of 395 Page Mill Rd, Palo Alto, Calif. 94306, United States e.g., one of the Sunpower series, emitting at 590 nm or 615 nm.

A fibre optic light guide 36 is provided to convey the polarised photons to an attenuation filter 37 and narrow band pass frequency filter 38. The purpose of the attenuation filter 37 is to reduce the number of photons emitted and the frequency filter 38 is to restrict the emitted photons to a narrow frequency range (typically plus or minus 1 nm). Without the attenuation filter 37 in place the number of photons emitted per LED pulse would be of the order of one million. With the filter in place, the average emission rate is 1 photon per 100 pulses. Importantly this means that more than one photon is rarely emitted per pulse. The attenuation filter 37 and frequency filter 38 can be combined in a single device if preferred. A spatial filter is provided to limit light leakage outside the channel.

The third (alignment) channel emitter 16 comprises a bright visible light laser emitter 40 and a shaped shutter 42 with an aperture in the form of an elongate cross 44 with the centre filled in as illustrated in FIG. 4 of the accompanying drawings. This emits a visible beam of light in the shape of the elongate cross. Preferably, a central portion the cross-shaped beam is blocked out (see dashed circle 45 in FIG. 4) and the quantum channel emitter 14 is arranged to transmit its signal along the resulting hole in the alignment beam. The cross shape enables the orientation of the transmitting apparatus about the z axis to be determined; other beam cross-sectional shapes can be used provided the shape has an asymmetry allowing orientation of the transmitting apparatus to be determined.

The frequency of the LEDs used for the quantum channel is different to that of the laser emitter 40 used for the alignment channel so as to avoid cross-talk and overload of the quantum channel detectors.

Additionally, the transmitting apparatus 2 comprises a control processor 46, a user interface 47, and a memory 48 for storing both data and control programs for controlling operation of the control processor 46 to operate the transmitting apparatus 2 as described below.

Figure 5:
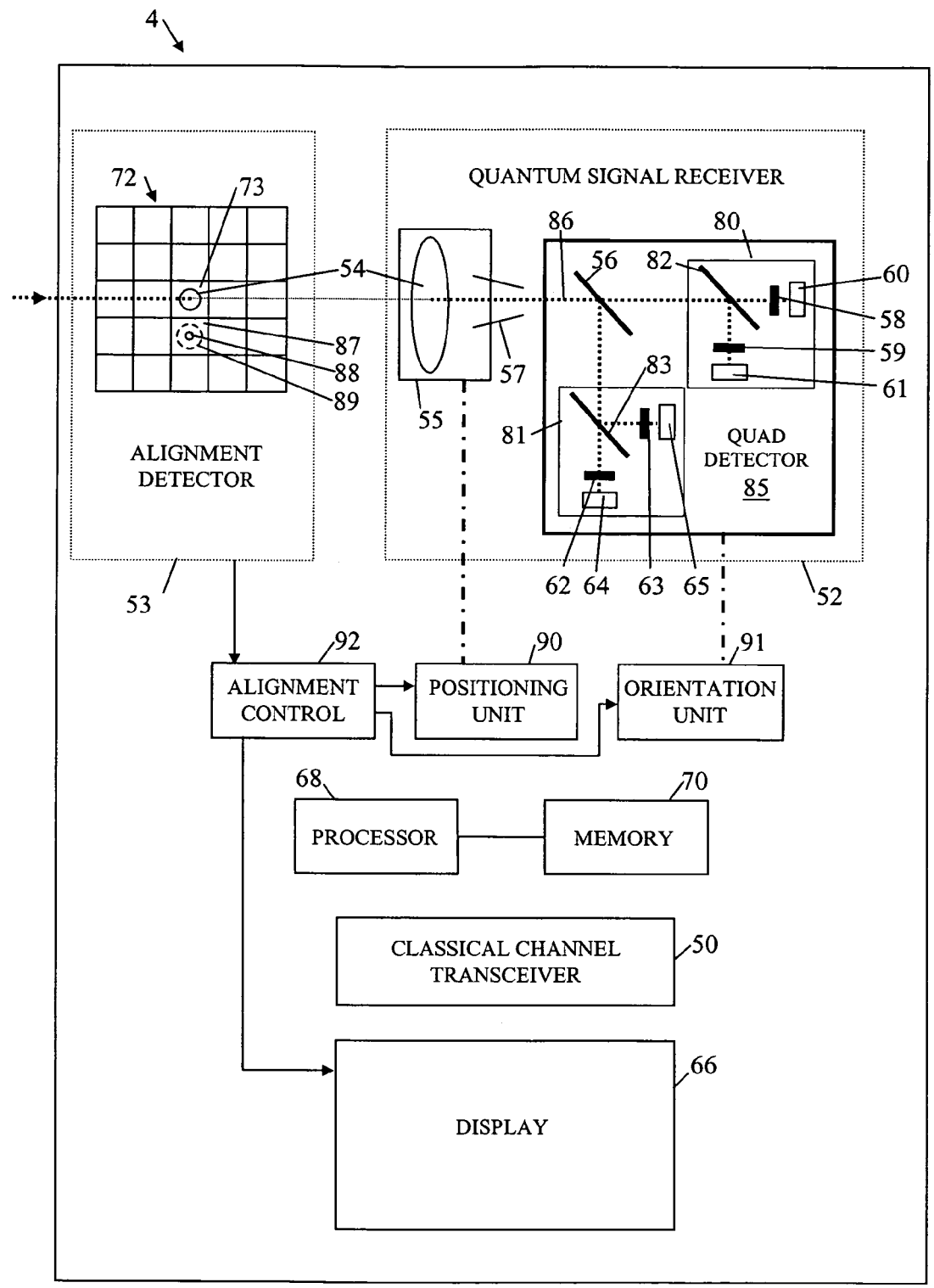
FIG. 5 is a schematic illustration of an embodiment of a quantum key distribution receiving apparatus usable in the FIG. 1 system.

The receiving apparatus 4 is further explained with reference to FIG. 5 of the accompanying drawings. The receiving apparatus 4 comprises a classical-channel transceiver 50 for receiving signals transmitted in the classical channel from transmitting apparatus 2, a quantum signal receiver 52 for receiving the second channel 30 output from transmitting apparatus 2 and a detector 53 for detecting the light signal output from the third (alignment) emitter 16.

The quantum signal receiver 53 comprises a lens 54, a yoke 55 for controlling the positioning of the lens 54, a quad-detector arrangement 85, and a fibre optic light guide for conveying photons received through the lens to the quad-detector arrangement 85. The end of the light guide 57 nearest the lens 54 is fixed on the optical axis of the lens 55 and is arranged to move with the lens 54 when the latter is moved by the yoke 55. The quad-detector arrangement 85 comprises a beam splitter 56, a first paired-detector unit 80, and a second paired-detector unit 81. The first paired-detector unit 80 comprises a beam splitter 82, polarizers 58, 59, and detectors 60, 61. The second paired-detector unit 81 comprises a beam splitter 83, polarizers 62, 63, and detectors 64, 65. The polarizers 58, 59 of the first paired-detector unit 80 have their directions of polarization orthogonal to each other; similarly, the polarizers 58, 59 of the second paired-detector unit 81 also have their directions of polarization orthogonal to each other. The polarization directions of the polarizers of the first paired-detector unit 80 are at 45° to the polarization directions of the polarizers of the second paired-detector unit 81. The beam splitters 56, 82 and 83 are depicted in FIG. 5 as half-silvered mirrors but can be of other forms such as diffraction gratings.

The detectors 60, 61, 64, 65 are avalanche photo-diodes, such as those available from Perkin Elmer Optoelectronics of 22001 Dumberry Road, Vaudreuil, Quebec, Canada, J7V 8P7 types C30902E, C30902S, C30921E and C30921S.

Dotted line 86 depicts the paths of photons passing through the lens 54 to the detectors 60, 61, 64 and 65 of the quad-detector arrangement 85.

The yoke 55 is a mounting for the lens 54 enabling electromechanical control of the lens position, using a positioning unit 90 (for example, similar to that used for conventional Compact Disc players). The yoke 55 can adjust the position of the lens 54 in a plane generally perpendicular to the optical path through the lens 54. The quad-detector arrangement 85 is rotatable about the optical axis of the lens 54 by an orientation unit 91.

The receiving apparatus 4 further comprises a user display 66, a control processor 68 and associated memory 70, configured to operate the receiving apparatus 4 as described below.

The alignment beam detector 53 comprises a rectangular array 72 of light detection elements arranged to detect light of the wavelength emitted by the laser emitter 40 used in the third emitter 16. This array 72 lies substantially in the plane of the lens 54 and surrounds the latter with the central zone 73 of the array 72 being left empty for the lens 54. The output of the array 72 is fed to an alignment control functional block 92 which is arranged to analyze this output to determine where and at what orientation the alignment beam is incident on the array 72 whereby to provide user feedback via display 66 and control of the positioning unit 90 and orientation unit 91. The alignment control block can be implemented by a program executed by the processor 68 and/or by dedicated circuitry.

The array 72, positioning unit 90, orientation unit 91, alignment control block 92, and display 66 (to the extent it is used to provide user feedback) together form an alignment subsystem of the receiving apparatus 4 intended to work in cooperation with the complementary alignment subsystem of the transmitting apparatus (the emitter 16 of the present embodiment) in order to correctly align the transmitting and receiving apparatus 2, 4.

As will be more fully described below, coarse aiming correction is effected by user feedback and fine aiming correction by operation of the positioning unit 90; orientation correction is effected by the orientation unit 91.

A method of operation according to a preferred embodiment of the present invention of the apparatus described above will now be described with reference to FIGS. 6A and B of the accompanying drawings.

Figure 6B:
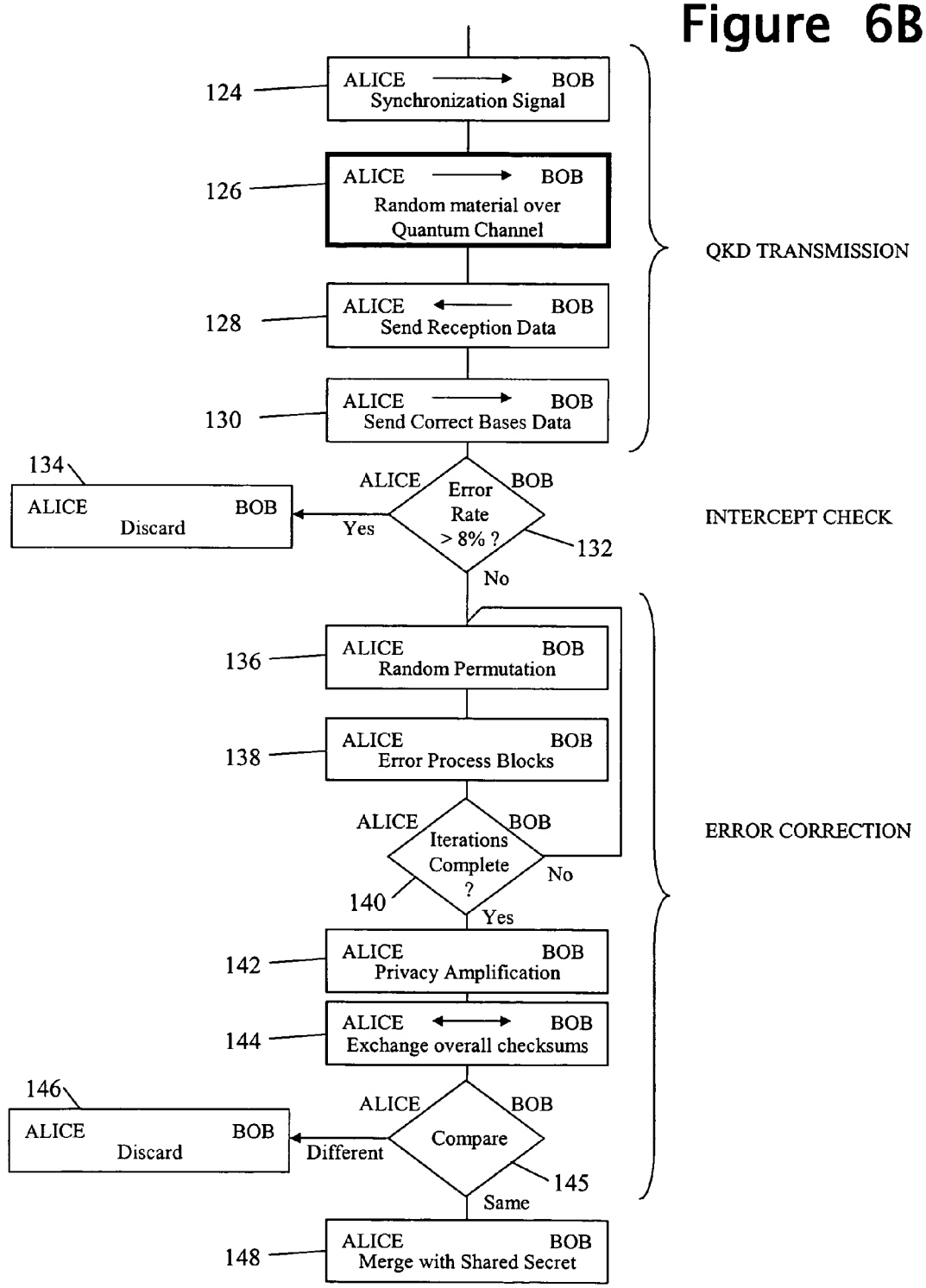

The convention is followed that the transmitting side for the quantum signal is referred to as Alice and the receiving side as Bob. In FIGS. 6A and 6B, the appearance of the name of Alice and/or Bob in block capitals in relation to a particular step indicates the active involvement of Alice and/or Bob, as the case may be, in that step.

When a user activates the transmitting apparatus 2 in step 100 (FIG. 6A) via the user interface 47, Alice will initiate a dialog with Bob using the IrDA channel. Alice tells Bob who she is and Bob responds by telling Alice who he is. According to the present embodiment, this is done using a cache of shared secrets possessed by Alice and Bob and either generated by previous interactions between them or downloaded from a trusted source. Typically, the shared secrets will be of the order of 100 kbits to 10 Mbits long. The shared secrets=a||b||c||rest_of_secrets where a, b and c are, for example, each 64 bits (the symbol || representing string concatenation). In step 102, Alice transmits (a) XOR (b) to Bob where XOR is the exclusive function. In step 104, Bob searches through his set of shared secrets looking for a match. Once the match is found, in step 106 Bob transmits (a) XOR (c) back to Alice. In step 108, Alice checks that this is the correct response. Both Alice and Bob then, in step 110, delete a, b and c from their set of shared secrets. i.e. shared secrets=rest_of_secrets.

In step 112, a user activates the alignment channel, typically by depressing an appropriately marked key on the relevant device. This causes the third emitter 16 to emit a bright visible beam of light through shutter 42 in the manner of a torch. Thus the user sees an elongate cross when the emitted beam strikes a suitable surface.

In step 114, the user uses the cross as a directional guide to aim the output towards the receiving apparatus 4.

As the user nears the target receiver (i.e. the lens 54), the alignment beam illuminates the array 72 enabling a determination to be made as to which way the beam should be moved to centre it on the array and thus on the lens 54. In step 116, the display 66 of the receiving apparatus 4 provides a visual indication of the direction in which the user should move the transmitting apparatus 2. This may be in the form of a directional arrow, a colour showing where the current aim of the transmitting apparatus 2 lies or any other indicia. The display additionally provides in step 118 an "on target" signal when the transmitting apparatus 2 is correctly aimed at the receiving apparatus 4, this signal being, for example, in the form of a displayed word/phrase, a circle around the centre of the target or any other suitable indicia. An audible signal can additionally/alternatively be provided.

The beam detector 53 in step 120 uses the asymmetricc shape (elongate cross shape) of the beam emitted as the orientation signal from laser emitter 40 to determine the orientation of the transmitting apparatus 2 and cause the orientation unit 91 to rotate the quad-detector arrangement 85 so as to adjust the orientation of the polarising filters 58, 59, 62, 63 such that vertical/horizontal and diagonal/anti-diagonal quantum signals are received appropriately. To minimise the degree of rotation required of the quad-detector arrangement 85, either of the paired-detector units 80, 81 can be used as the vertical/horizontal detector whilst the other unit is used as the diagonal/anti-diagonal detector.

Slight errors in the directional alignment of the transmitting apparatus 2 relative to the receiving apparatus 4, such as those caused by minor hand movements, can be accommodated by the positioning unit 90 adjusting the position of the lens 54 in step 122. Thus, when the beam detector 53 determines that the alignment signal is off-centre, the positioning unit 90 is used to adjust the lens position in the plane of the lens 54 to correct the alignment of the quantum communication signal.

When alignment is achieved, the quantum signal emitted by the emitter 14 will pass through the lens 54 and be guided by optical fibre 57 to the quad-detector arrangement 85, and the polarization directions of the signal will align with those of the quad-detection arrangement 85.

Once the quantum channel has been established, a quantum key transfer can be made. The transfer of information based on quantum cryptography is carried out using a variant of the BB84 quantum coding scheme. The specific algorithm according to the preferred embodiment will now be described.

Alice and Bob have a predetermined agreement as to the length of a time slot in which a unit of data will be emitted. To achieve initial synchronisation, Alice in step 124 (see FIG. 6B) overdrives the alignment emitter 40 to produce a "START" synchronisation signal. Alternatively, the quantum signal channel can be used for synchronisation.

In step 126, Alice randomly generates a multiplicity of pairs of bits, typically of the order of $10^8$ pairs. Each pair of bits consists of a message bit and a basis bit, the latter indicating the pair of polarization directions to be used for sending the message bit, be it vertical/horizontal or diagonal/anti-diagonal. A horizontally or diagonally polarised photon indicates a binary 1, while a vertically or anti-diagonally polarised photon indicates a binary 0. The message bit of each pair is thus sent over the quantum signal channel encoded according to the pair of polarization directions indicated by the basis bit of the same pair. Randomness in generating the pairs of bits can be achieved by a hardware random number generator such as a quantum-based arrangement in which a half-silvered mirror is used to pass/deflect photons to detectors to correspondingly generate a "0"/"1" with a 50:50 chance; an alternative form of random number generator can be constructed based around overdriving a resistor or diode to take advantage of the electron noise to trigger a random event.

When receiving the quantum signal from Alice, Bob randomly chooses which basis (pair of polarization directions) it will use to detect the quantum signal during each time slot and records the results.

The sending of the message bits of the randomly-generated pairs of bits is the only communication that need occur using the quantum channel. The remainder of the algorithm is carried out using the classical channel.

In step 128, Bob informs Alice of the time slots in which a signal was received and the basis (i.e. pair of polarization directions) thereof.

In step 130, Alice sends to Bob confirmation of which of those bases is correct. Alice and Bob then use the bits corresponding to the time slots where they used the same bases, as the initial new shared secret data. However, there may well be discrepancies (errors) between the versions of the new shared secret data held by Alice and Bob due, for example, to noise in the quad detector arrangement 85.

In step 132, error rate checking is carried out by Alice and Bob comparing their versions of a selected subset of the initial new shared secret data. The higher the error rate, the greater the probability is that the quantum signal has been intercepted. Error rates above about 12% are generally unacceptable and, preferably, an upper threshold of 8% is set since above this figure the number of bits available after error correction and privacy amplification is too low.

If the error rate is found to be greater than the 8% threshold, the session is abandoned and the new shared secret data is discarded (step 134).

If the error rate is below the 8% threshold, error correction is then carried out on the initial new shared secret data (after the latter have been reduced by discarding the subsets used for error rate determination).

Error correction is effected using a version of the CAS-CADE algorithm in which two basic steps 136, 138 are repeated until a stable condition is reached (typically after six or seven iterations); alternatively, and as indicated by step 140 in FIG. 6B, the number of iterations can be fixed. The two basic steps are:

(1) A preliminary step 136 in which Alice and Bob effect the same random permutation of their respective versions of the new shared secret data. This is done as follows. Alice and Bob use the same subset of bits (typically 64 bits) of their new shared secret data as a seed for a deterministic pseudo random number generator. This pseudo random number generator is used to permute the data. This way both Alice and Bob will permute their data in the same way. The shared secret is then reduced by the subset used as the seed for the random number generator. This permutation step is designed to do two things—it uniformly redistributes the bits in error and also make life difficult for external observers (who do not know how the bits are being redistributed).

The remaining new shared secret data is then treated as if divided into blocks of a size chosen such that for the measured error rate each block has, on average, one error.

(2) An error elimination step 138 in which Alice and Bob process each block of their respective versions of the shared secret data as follows. Both Alice and Bob determine the parity of the block and Bob sends its parity value to Alice. If Alice finds that Bob's parity value is the same value as Alice has determined for her block, that block is accepted as error free (although it could have any even number of errors); if Alice finds that her parity value differs from Bob's, the block is assumed to have one error (though it could have any odd number of errors); in this case, a binary search process is followed to track down the error. This search process involves the steps of halving the block in error, and determining which half contains the error by Bob sending Alice the parity of one of the half blocks which Alice compares with her parity value for the corresponding half block in her possession; if the parity values differ, the errored half block is the one being processed whereas if the parity values are the same, the errored half block is the one not being processed. The foregoing steps are then repeated for the errored half block and so on until the errored bit is identified). The errored bit is then either discarded or Bob flips the value of his version of the bit.

The above-described error correction process will generally achieve an error level of $1:10^6$ or better which is sufficient for present purposes.

However, it will be appreciated that the error correction process involves the exchange of considerable amounts of parity information between Bob and Alice which is potentially of use to an eavesdropper. It is also to be noted that although the error-rate-based intercept check carried out in step 132 will detect interception of any substantial portion of the quantum signal transmission, an eavesdropper may still be able to successfully intercept a small number of bits of the quantum signal as there will be a finite (though very small) probability that more than one photon is sent during a time slot over the quantum channel thereby leaving open the possibility that an eavesdropper with a beam splitter can capture one photon while allowing Bob to receive the other photon. Accordingly, a privacy amplification step 142 is next performed. In this step both Alice and Bob reduce the size of their respective versions of the new shared secret data using a deterministic randomizing permutation, the reduction in size being dependent on the amount of parity information exchanged and the level of security required.

A detailed discussion of privacy amplification can be found, for example, in the paper "Generalized Privacy Amplification", C. H. Bennett, G. Brassard, C. Crepeau, and U. M. Maurer; IEEE transactions on Information Theory, IT-41 (6), p1915-1923. In general terms, it can be said that if the new shared secret x has a length of n bit after error correction, and the eavesdropper has at most k deterministic bits of information about the new shared secret, then if an appropriate class of hash function h( ) is applied to the secret random data:

$$\{0,1\}^n \rightarrow \{0,1\}^{n-k-s}$$

where s is a safety parameter $0<s<n-k$, the eavesdroppers expected information on h(x) is no more than $(2^{-s}/\ln 2)$ bits. Thus varying the value of (n–k–s) gives different levels of security for the result of the hash of x; in particular, increasing s increases the level of security.

After the error correction and privacy amplification, Alice and Bob are very likely to have the same result. However, in step 144 Alice and Bob seek to re-assure themselves that this is the case by exchanging a hash of their new shared secret data; to protect the transmitted hash, it is XORed with bits popped from the store of shared secrets. If the hashes differ (checked in step 145), the newly shared data is discarded (step 146) together with the bits used from the store of shared secrets.

On the assumption that Alice and Bob have the same new data, they merge the new data in with the existing shared secret. This merging involves the use of a hash function to ensure that the external observer has no knowledge of the final shared secret. Data from this new shared secret is then used to generate a session key (for example, a 128 bit session key) for encrypting the ex change of application data between the transmitting apparatus and receiving apparatus over the classical channel, the data used for creating the session key being discarded from the shared secret.

The quantum signal element of the quantum key distribution need only take 0.5-1.0 seconds so the user is not required to keep the transmitting apparatus 2 on target for a long period.

It will be appreciated that many variations are possible to the above-described embodiment of the invention.

For example, provision can be made for ensuring that the plane of the lens 54 is adjusted to be at least nearly orthogonal to the z axis of the quantum signal emitter since although the quantum signal detector 52 described about will tolerate some misalignment between the z axis of the emitter and the optical axis of the lens 54, if the misalignment is too great, photons passing through the lens may not be channelled to the quad-detector arrangement. To this end, an element of the array 72 is replaced with an opaque plate 87 formed with a small aperture 88 behind which is an array 89 of light detectors (shown dashed in FIG. 5). When the alignment beam falls on the array 72, the angle between the z axis of the transmitting apparatus 2 and the optical axis of the lens 54 will determine which of the detectors of the array 89 will be activated. This is illustrated in FIG. 7A in which:

dotted line 150 illustrates the path of the alignment beam through the aperture in plate 87 when the plane of the lens is orthogonal to the z axis of the quantum signal emitter—in this case, the beam strikes the central detector 151 of the array 89; and dotted line 155 illustrates an example path of the alignment beam through the aperture in plate 87 when the plane of the lens is not orthogonal to the z axis of the quantum signal emitter—in the illustrated case, the beam strikes a detector 155 of the array 89.

Depending on which detector of the array 89 is illuminated by the alignment beam, the angle of the lens 54 is adjusted by rotating it about orthogonal axes lying in the plane of the lens 54 (the yoke 55 and unit 90 being adapted, for example, to perform this task in response to signals from the control unit 92, this latter being fed with the output from the array 89). The angle of the plate 87 and detector array 89 are similarly adjusted (for example, by mechanical linkage with the yoke 55) whereby upon the plane of the lens 54 becoming orthogonal to the z axis of the quantum signal emitter, the alignment beam 155 will strike the central detector 151 of the array 89 (see FIG. 7B) causing angular adjustment of the lens 54, plate 87 and array 89 to be discontinued. The adjustment of the angling of the lens 54 to make it orthogonal to the z axis of the quantum signal emitter, can be considered as part of the overall alignment process.

Although in the embodiment described above, a single lens 54 is used, a plurality of independent lenses can be provided either leading to a common quad-detector arrangement for all such lenses or to a respective quad-detector arrangement for each lens. In this manner, the operative target area is effectively increased and it no longer necessary to mount the lenses on a yoke to compensate for small alignment errors.

Indications of any suitable sort can be used to guide a user to centre the quantum signal on the receiving apparatus 4 using the alignment beam. For instance, an audible indication can be used with beeps of increasing frequency the nearer the receiving apparatus 4 the user aims with a continuous noise when the signal is centred.

Equally, though it is convenient for the alignment signal to be visual, it need not be.

As an alternative embodiment, the alignment signal can be emitted using polarised photons of predetermined polarisation, whereby the polarisation of the photons is used as the orientation signal by the receiving apparatus 4. In this embodiment a polarising filter is utilised in front of the alignment signal emitter. The polarising filter may be rotated through 90° periodically to assist the receiving apparatus 4 in receiving the orientation signal. The receiving apparatus 4 is modified by having a corresponding polarising filter in front of the orientation signal detector, which detector and polarising filter is rotated until the orientation signal is received, thus determining an orientation of the transmitting apparatus 2 relative to the receiving apparatus 4.

Another simple way of detecting polarization orientation errors is to provide the mobile device with tilt sensors, the outputs of these sensors being sent over the classical communications channel to the receiving apparatus to enable the latter to automatically adjust the orientation of the quad-detector arrangement.

In the illustrated embodiments of the invention a single laser beam emitted from the alignment channel emitter 16 is used for both aiming and orientation alignment. It will be appreciated that rather than relying on a single alignment channel signal for all aspects of alignment, separate alignment signal (forming respective alignment sub-channels) can be used for the different alignment adjustments needed.

Figure 8:
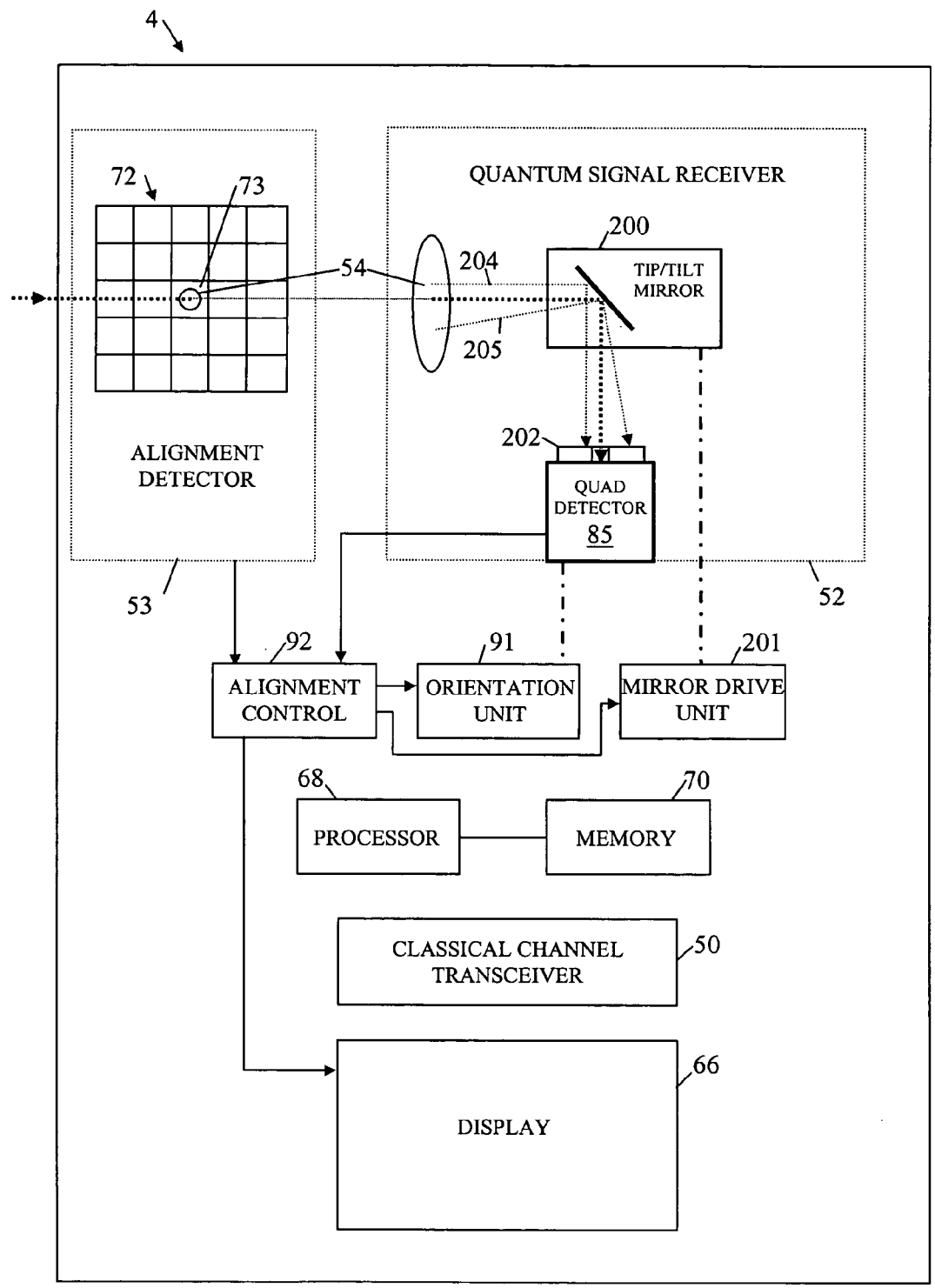
FIG. 8 is a schematic illustration of a further embodiment of a quantum key distribution receiving apparatus usable in the FIG. 1 system.

In another variant, depicted in FIG. 8, the above-described yoke arrangement 55 is replaced by a tip/tilt mirror 200 the angle of which is set by a mirror drive unit 201 in dependence on the output of the alignment control 92 such as to compensate for alignment errors and ensure that the quantum signal passes via the now static lens 54 to the quad detector arrangement 85. Rather than relying on the alignment detector 53 to determine the amount of adjustment to be applied using the tip/tilt mirror (as was the case for adjustment of the yoke), in another embodiment a further detector array 202 is positioned around the aperture of the quad detector 85 to detect quantum signal misalignment (as depicted in FIG. 8 by the dotted rays 204 and 205). The detector array 202 is sensitive to a laser beam emitted by the QKD transmitting apparatus that is sent along the path of the quantum signal channel prior to the quantum signal being transmitted (it will be appreciated that the adjustment of the tip/tilt mirror therefore takes place before the adjustment of the orientation of the quad detector that is effected for the purpose of polarization alignment, the quantum signal replacing the laser beam before the polarization alignment step; it will also be appreciated that the quad detector may need temporary screening to protect its sensitive detectors from the laser beam).

Although in the described embodiments the quantum signal emitter has been placed in the mobile device and the quantum signal detector in the complementary base station apparatus, it would alternatively be possible to put the quantum signal emitter in the complementary apparatus and the quantum signal detector in the mobile device. For cost reasons, however, mechanical adjustment mechanisms for effecting aiming and orientation alignment are preferably kept in the complementary apparatus and appropriately modified.

It would also be possible for the alignment signals to be emitted by the complementary apparatus and detected at the mobile device, the latter then providing feedback over the classical communication channel to the complementary apparatus to enable it to take appropriate alignment correction action, including by way of visual/audible feedback to the user. Alternatively, visual/audible feedback to the user can be provided directly by the mobile device.

In the situation where the quantum signal detector is provided at the complementary apparatus and has a significant operative area (for example, due to the replication of detector elements), it may be possible to eliminate any fine alignment adjustment action (such as effected using the yoke arrangement 55 of the FIG. 5 embodiment or the tip/tilt mirror 200 of the FIG. 8 embodiment); however, it is generally preferred to at least provide the user with audible/visual feedback that they are on target.

Whilst it is preferred to automatically correct for polarization orientation discrepancies between the mobile device and the complementary apparatus, it is also possible to arrange for feedback to be provided to the user to get the user to appropriately rotate the mobile device.

In a further variant, where the mobile device is a camera phone, it is possible to electronically place aiming cross-hairs on the image seen through the camera functionality of the device, these cross hairs indicating both where the quantum signal emitter of the device is being pointed and its polarisation orientation.

Thus, preferred embodiments of the present invention provide an apparatus enabling a possibly unsteady user to correctly line up and orientate a QKD transmitter-receiver pair to enable a quantum key distribution to take place. The mobile device 2 is portable in that it can conveniently be carried by a user, and although only effective over a relatively short range (typically 3-5 meters), is usable for quantum key distribution in typical consumer environments such as a high street, shop, bank etc. In many expected applications, an optional range of less than 1 meter will suffice. By providing apparatus enabling freestanding (i.e. no tripods, clamps etc.) to be used in a quantum key distribution, the use of the technique can extend into everyday devices.

The invention claimed is:

1. A device for quantum key distribution, herein QKD, using a quantum signal of polarized photons, the device being intended for use with a complimentary apparatus, the device comprising:
    a QKD subsystem comprising a QKD transmitter for inter-working with a complimentary QKD receiver of said apparatus; and
    an alignment subsystem arranged to wirelessly interact with said apparatus to enable generation of adjustment signals for use in aligning the QKD transmitter and QKD receiver such that the QKD transmitter is pointing at the QKD receiver and the polarization axes of the QKD transmitter and QKD receiver are aligned, wherein the alignment subsystem comprises,
    an alignment beam transmitter for sending an alignment beam having an elongate cross-shape to said apparatus to enable the apparatus to generate first said adjustment signals for aligning the QKD transmitter and QKD receiver such that the QKD transmitter is pointing at the QKD receiver,
    wherein a section of the alignment beam is blocked out and wherein the QKD transmitter is to transmit the quantum signal in the blocked out section of the alignment beam.

2. The device according to claim 1, wherein the device is suitable for hand-held operation.

3. The device according to claim 1, wherein said alignment beam transmitter is arranged to condition said alignment beam such that said apparatus is able to use the alignment beam to generate second said adjustment signals for aligning the QKD transmitter and QKD receiver such that the polarization axes of the QKD transmitter and QKD receiver are aligned.

4. The device according to claim 3, wherein said alignment beam transmitter is arranged to condition said alignment beam by giving the alignment beam the elongate cross-shape.

5. The device according to claim 3, wherein said alignment beam transmitter is arranged to condition said alignment beam by imparting it a predetermined polarization.

6. The device according to claim 4, wherein said alignment beam is a laser beam in the visible spectrum whereby the image created when the alignment beam strikes a surface enables a user to make appropriate alignment adjustments manually.

7. The device according to claim 1, wherein the alignment subsystem is further arranged such that said adjustment signals are usable to align the optical axes of the QKD transmitter and QKD receiver.

8. The device according to claim 1, in which the QKD transmitter is configured to emit photons polarized according to a first orthogonal pair and a second orthogonal pair, whereby the polarization of the first orthogonal pair is at 45° to the polarization of the second orthogonal pair.

9. The device according to claim 1, wherein the alignment subsystem comprises an alignment beam receiver for detecting an alignment beam sent by said apparatus, the alignment subsystem being arranged to generate, in dependence on the incidence of the alignment beam on the alignment beam receiver, first adjustment signals for aligning the QKD transmitter and QKD receiver such that the QKD transmitter is pointing at the QKD receiver.

10. The device according to claim 1, wherein the QKD subsystem further comprises a processing unit arranged to cooperate with a corresponding unit of the complementary apparatus, by signals exchanged via a classical communications transceiver of the device, in order to effect error correction of random material shared by the device and apparatus via said quantum signal.

11. An apparatus for quantum key distribution, herein QKD, using a quantum signal of polarized photons, the apparatus being intended for use with a complimentary device, the apparatus comprising: a QKD subsystem comprising a QKD receiver for inter-working with a complimentary QKD transmitter of said device; and
    an alignment subsystem arranged to wirelessly interact with said device to generate adjustment signals for use in aligning the QKD transmitter and QKD receiver such that the QKD transmitter is pointing at the QKD receiver and the polarization axes of the QKD transmitter and QKD receiver are aligned, wherein the alignment subsystem is arranged to detect an elongate cross-shaped alignment beam to allow for orientation of the QKD transmitter to be determined,
    wherein a section of the alignment beam is blocked out and wherein the QKD receiver is to receive the quantum signal in the blocked out section of the alignment beam.

12. The apparatus according to claim 11, wherein the alignment subsystem comprises the alignment beam receiver for detecting the alignment beam sent by said device, the alignment subsystem being arranged to generate, in dependence on the incidence of the alignment beam on the alignment beam receiver, first said adjustment signals for use in aligning the QKD transmitter and QKD receiver such that the QKD transmitter is pointing at the QKD receiver.

13. The apparatus according to claim 12, wherein the alignment subsystem further comprises at least one of audio and visual signaling arrangement for generating at least one of audio and visual alignment feedback to a user of said device in dependence on said first adjustment signals.

14. The apparatus according to claim 12, wherein the alignment subsystem further comprises an electro-mechanical alignment unit for adjusting the position of a collecting lens of the alignment beam receiver in dependence on said first adjustment signals.

15. The apparatus according to claim 12, wherein the alignment subsystem further comprises an electro-mechanical alignment unit for adjusting the orientation of a tip/tilt mirror of the alignment beam receiver in dependence on said first adjustment signals.

16. The apparatus according to claim 12, wherein said alignment subsystem is arranged to detect a conditioning of said alignment beam indicative of the polarization axes of the QKD transmitter whereby to generate second said adjustment signals for aligning the QKD transmitter and QKD receiver such that the polarization axes of the QKD transmitter and QKD receiver are aligned.

17. The apparatus according to claim 16, wherein the alignment subsystem further comprises an electro-mechanical polarization-alignment unit for adjusting the orientation of the QKD receiver about its optical axis in dependence on said second adjustment signals.

18. The apparatus according to claim 11, wherein said alignment subsystem is arranged to detect said conditioning of said alignment beam in the form of the elongate cross-shape.

19. The apparatus according to claim 16, wherein said alignment subsystem is arranged to detect said conditioning of said alignment beam in the form of a predetermined polarization.

20. The apparatus according to claim 11, wherein the alignment subsystem is further arranged such that said adjustment signals are usable to align the optical axes of the QKD transmitter and QKD receiver.

21. The apparatus according to claim 11, in which the QKD receiver comprises a detector for horizontally polarized photons, a detector for vertically polarized photons, a detector for diagonally polarized photons and a detector for anti-diagonally polarized photons.

22. The apparatus according to claim 11, wherein the QKD subsystem further comprises a processing unit arranged to cooperate with a corresponding unit of the complementary device, by signals exchanged via a classical communications transceiver of the apparatus, in order to effect error correction of random material shared by the device and apparatus via said quantum signal.

* * * * *